INVENTORS
JAMES N. CAST
WILLIAM H. HORNING
FRANK TWISS
BY
Fraser and Bogucki
ATTORNEYS

INVENTORS
JAMES N. CAST
WILLIAM H. HORNING
FRANK TWISS

BY Fraser and Bogucki

ATTORNEYS

United States Patent Office 3,374,467

Patented Mar. 19, 1968

3,374,467

DIGITAL DATA PROCESSOR

James N. Cast, Santa Ana, William H. Horning, Garden Grove, and Frank Twiss, Huntington Beach, Calif., assignors, by mesne assignments, to Lear Siegler, Inc., Santa Monica, Calif., a corporation of Delaware Filed May 27, 1965, Ser. No. 459,360

11 Claims. (Cl. 340—172.5)

ABSTRACT OF THE DISCLOSURE

A processor for data words having a predetermined bit sequence is disclosed. Data is received in a storage device at the processor. A control signal generator emits a variable control signal which continually identifies the location of the bits making up data words delivered to the storage device. The bit sequence of the data words are extracted in accordance with the variable control signal in any predetermined sequence and at any predetermined output rate; and thus, the input and output bit sequences need not be the same.

Figure 1:
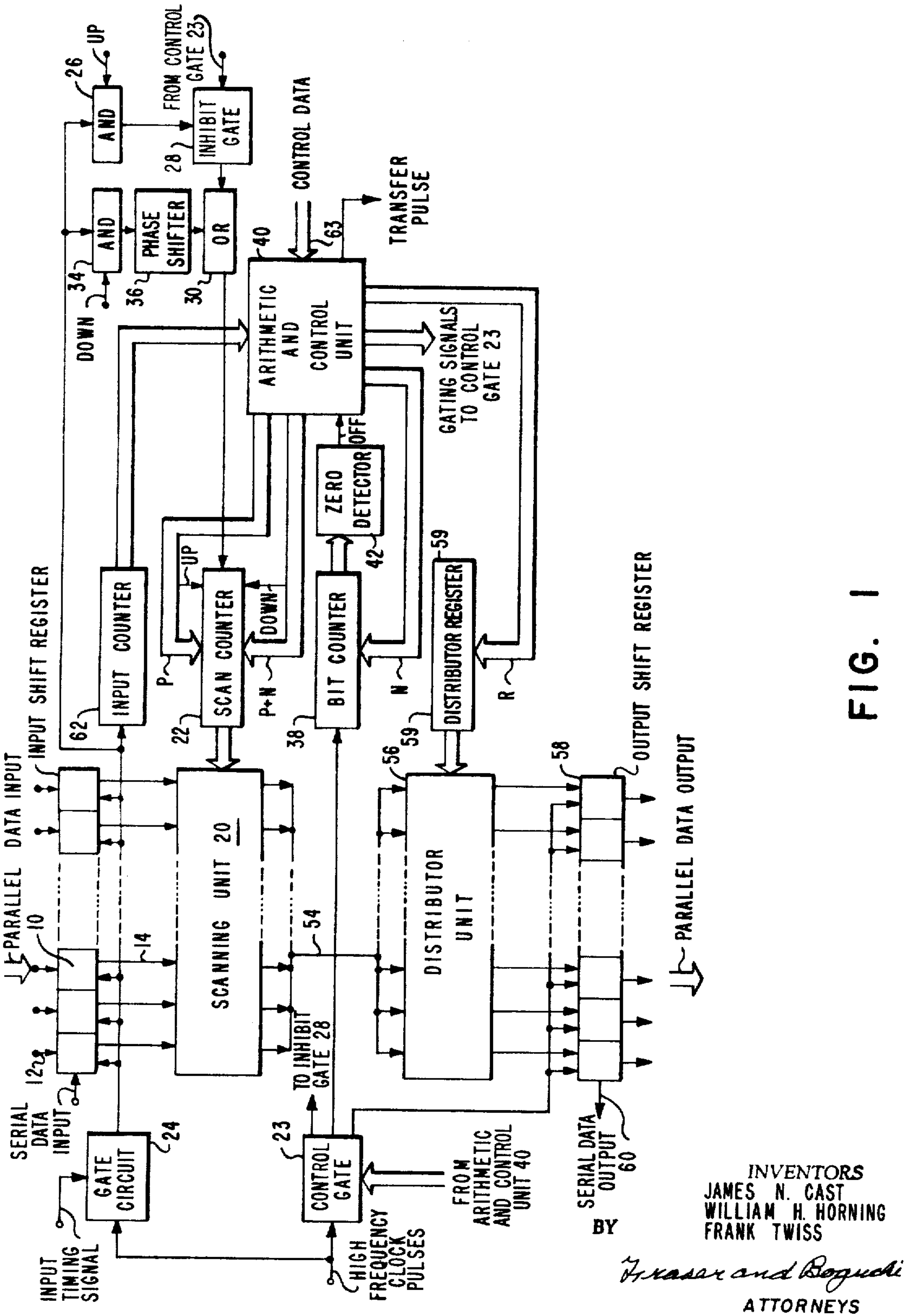

This invention relates generally to digital data handling systems, and more particularly to digital data processing for changing data formats by reversing and realigning bit sequences, changing data rates, and accommodating either parallel or serial modes of data transmission.

Usually, in telemetry systems and the like, digital data is transmitted serially as a continuous sequence of individual data bits that, upon being received, must be separated into data word groupings of the proper length for proper interpretation and utilization. Sometimes digital data may also be transmitted in parallel form so that all the bits forming a single word are received simultaneously. In most instances, some revision of the data format is necessary to suit the particular use made of data. For example, the bit sequence in a word must sometimes be reversed to place the most significant or least significant bit first, so as to match the bit sequence of other words. Certain computer operations cannot be performed unless the words are properly aligned. If words representing various digital values have different bit lengths, the least significant or most significant usually must be aligned for proper evaluation. Often digital data is transmitted at a rate much lower than the data handling rate of the equipment intended to utilize the information, particularly in certain telemetry applications. That is, the input bit rate differs from the output, and the bit rate of the data should first be adjusted before introducing it to the handling equipment.

Modern digital data handling equipment and telemetry receivers should have the capability for initially revising the format of incoming digital data in each of these ways so that the information is available for immediate use in associated data processors or computers. Special input arrangements previously devised for these purposes have generally used a separate circuit designed for performing each format change. Obviously, if various format changes were required, much costly circuitry was needed. In some cases, data formats can be changed by taking advantage of the great versatility and speed of the associated general purpose computer or data processor which ultimately receives the incoming data. However, the computer or data processor must be specially programmed, and, with conventional digital techniques, some of these format changes can become rather awkward and extremely wasteful of valuable operating time.

Therefore, it is an object of the present invention to provide an improved data processing arrangement for quickly and simply revising the data format of incoming digital data.

Another object of the present invention is to provide a digital data processing arrangement capable of revising digital data formats by reversing bit sequences, of providing both parallel and serial reception and output of data words and of adjusting the data rate to suit the higher data handling rate of the associated equipment coupled to the output, wherein each revision is accomplished in a highly efficient manner utilizing a minimum of circuitry.

A further object of the present invention is to provide an input arrangement wherein digital information signals are received in either serial or parallel form to be changed into separate multibit data words having the individual bits selectively aligned and arranged in a given sequence for serial or parallel output, and wherein the data output rate for the data words may be independently selected at rates greatly exceeding the input data rate.

Yet another object of the present invention is to provide improved digital techniques for selectively adjusting the bit sequence and alignment of data words received and for adjusting the output data rate substantially independent of the data input rate.

These and other objects are accomplished in accordance with this invention by providing an input register capable of receiving incoming digital information, either in serial or parallel form, to be stored as individual bits in the order received, an output register capable of transmitting the bits of a data word stored therein, either serially or in parallel, to an output at a selected rate determined by an internal clock frequency and means for transferring the individual bits in a selected order, preferably at a rate in excess of the data input rate, from selected positions in the input register to selected positions in the output register. The bits contained in each data word are stored and received separately in the stages of the input register in the order received to be extracted later by scanning means that can selectively interrogate a particular stage designated by a scanning control unit. Those stages containing bits of an input data word can then be scanned in any order, depending upon the bit sequence desired at the output. Data bits extracted from the input register by the scanning unit are routed to the output register to be stored in serial order beginning at the stage designated by a distribution control unit. Thus, a word can be entered in the output register at a preselected position so as to have its most significant bit or least significant bit aligned with that of other words, thus facilitating certain computations and data handling operations in the associated equipment. In addition, data words stored in the output register can be output serially at the same rate at which the bits are being extracted from the input register. The output data rate may be several times the input data rate and is normally chosen to accommodate the high speeds of the modern computers and data processing equipment coupled to the output of telemetry receivers and the like.

In accordance with one particular aspect of this invention, the input and output data registers consist of multistage shift registers capable of serially shifting the data bits stored therein from one stage to the next in response to clock pulses. Each stage of both registers contains individual input and output access terminals that allow a binary digit to be directly stored in or extracted from that particular stage. This allows the input shift register to accept data words to be stored in parallel form, and allows the stored bits to be extracted one at a time from the different stages at a rate and in a sequence determined by the scanning control unit. In the output register the individual input and output access couplings for each stage allow the bits extracted from the input register to be introduced at any stage selected by the distributor control, and later to be delivered in parallel to the output as a complete word with a preselected bit alignment.

In accordance with a further particular aspect of this invention, the control unit for the scanning operation consists of a reversible counter, hereinafter referred to as the scan counter, coupled to operate with a count decoder and gating arrangement to select that stage in the input shift register designated by the existing count. Before each scanning operation an initial count, identifying the stage containing a particular bit in the data word, is set into the scan counter. After the first bit is extracted, the count then proceeds either up or down to extract the remaining bits of the word in a predetermined order for entry into the output register. The scanning counter counts high frequency pulses, which are also used in operating the output shift register, and thus determine the serial output data rate. Normally the scanning operation begins with the bit at one end of a data word contained in the input register and moves sequentially from one stage to the next as the count changes by one for each pulse, until the last bit in the word has been transferred to the output register. However, if the bits in the input register are shifted during the scanning operation, the counting in the scan counter is appropriately modified, either by changing the count by two when the scanning operation proceeds in the same direction that the bits are being shifted in the input register or by preventing the count from being changed by the next pulse when the scanning operation proceeds in the other direction, that is, in the direction opposite that of the bit shift in the input register.

Also in accordance with this invention, the initial count received by the scan counter at the beginning of each scanning operation is introduced in parallel from an appropriate source capable of identifying one end of the word. The count can then proceed in one direction until the position of the last bit is reached, at which time the scanning operation stops. Where data transmitted as a repetitive sequence of individual data bits forming separate data words, the beginning of each repetitive sequence, and sometimes its character, is identified by a short initial bit sequence. After this initial bit sequence has been detected, the first bit of the first word can be tracked simply by providing a separate input counter to count the shift pulses applied to the input register. An appropriate arithmetic and control unit responds, in accordance with a reset program chosen to handle the particular sequence, to introduce an initial count into the scan counter identifying the stage containing the bit found at either end of the word. At the same time, the scanning counter is set by an appropriate control signal to count the higher frequency clock pulses in the appropriate direction, either up or down, depending on the direction of scan.

The scanning operation is stopped after a complete word has been transferred to the output register, and preparations are begun for the next scanning operation. To insure that scanning stops at the proper point, a bit counter can be used to receive an initial count at the beginning of each scanning operation equal to the number of bits in the word being scanned. As the scanning operation begins, the high frequency clock pulses used in controlling the scan are applied to the bit counter to cause it to count downwards to zero. A zero detector coupled to the bit counter generates a stop signal that stops the scanning operation when the bit count reaches zero, which means that all bits in the word have been scanned and transferred to the output register.

Figure 2:
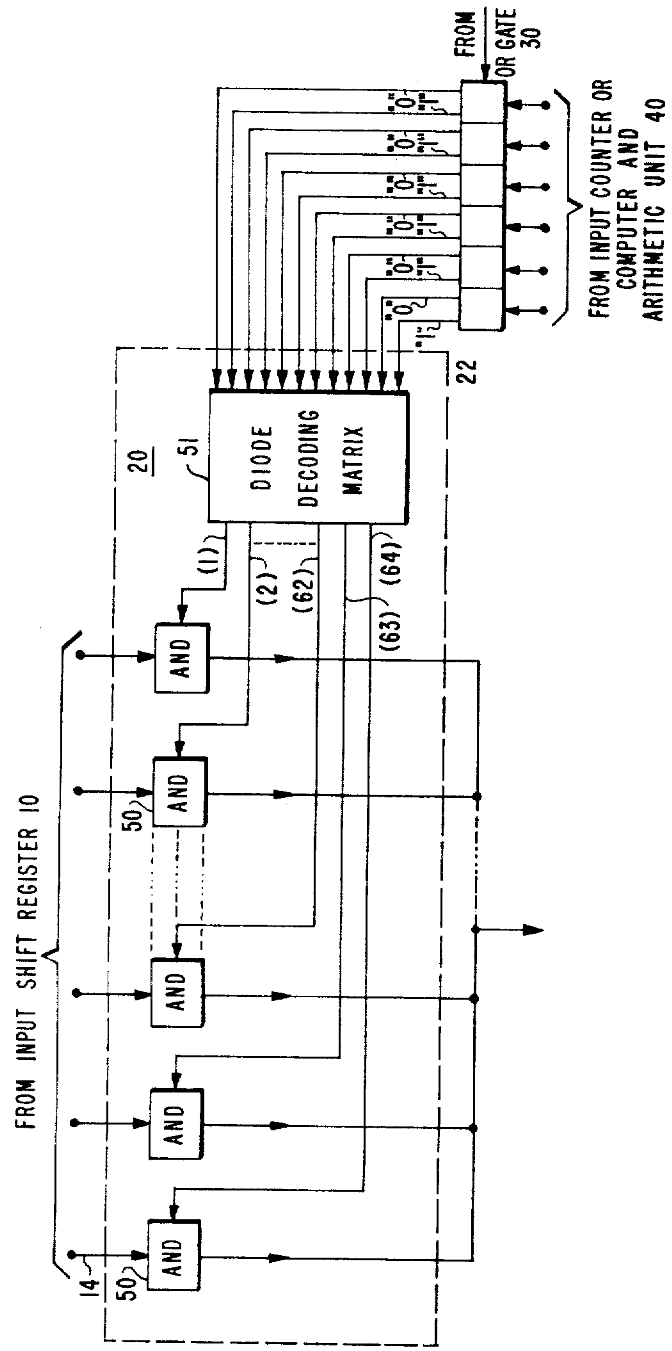

A better understanding of these and other aspects of the invention may be had by referring to the following detailed description taken in conjunction with the accompanying drawings, in which:

FIG. 1 illustrates in simplified block diagram form a preferred embodiment of a data word processing arrangement in accordance with the invention; and, FIG. 2 illustrates schematically a commutation circuit for use in the preferred form of the data word processing arrangement illustrated in FIG. 1.

Referring now to FIG. 1, a data word processing arrangement in accordance with this invention is illustrated in simplified block diagram form since the particular digital circuits used are well known and can be functionally implemented in various ways using conventional digital techniques. It is to be understood at the outset that the logic arrangements illustrated and described herein are offered merely by way of example to illustrate the nature of the invention, and that it would be possible for those skilled in the art, using the teachings of the basic inventive concept involved herein, to mechanize data word processing arrangements in accordance with this invention in various ways within the scope of the appended claims. However, the arrangements shown in the drawings illustrate one preferred form of the invention that is intended to operate as a separate input unit. Some of the more useful alternative arrangements and modifications will be pointed out herein, but no attempt will be made to catalogue all possible alternative arrangements within the scope of this invention that might occur to those skilled in the art.

In the preferred embodiment shown in the drawing, incoming digital data is accepted in either serial or parallel form from an external source, such as telemetry receiver or other digital data transmission link, by a multi-stage input shift register 10. In this example, the input shift register 10 is assumed to have sixty-four binary stages, each capable of storing a binary bit value received either serially from a preceding stage or directly in parallel from the external source. The binary stages are connected in sequence to form a conventional binary shift register operated by appropriate shift pulses synchronized with the incoming digital information so that there is a minimum of one shift pulse for each binary bit received. This insures that each bit received is shifted to a succeeding stage to make room for the next succeeding bit.

The incoming digital information is made up of sequences of individual binary bits combined to form data words. Each bit position in a data word has a particular meaning, or significance, as it is more commonly known. For example, the multibit binary words usually represent numbered values, and in accordance with the usual binary numbering system, each bit position signifies a different digital value. In any particular data word, the bit representing the highest digital value is referred to as the most significant bit (MSB) and that representing the smallest digital value is referred to as the least significant bit (LSB).

Each shift register stage, besides having the usual interstage coupling with adjacent stages for shift register operation, also has a separate input coupling for accepting binary bits forming a data word in parallel form directly from an external source. In addition, each of these stages has a separate output coupling 14 from which the binary value stored in that stage can be extracted using a scanning unit 20, which operates in response to the instantaneous count contained in a scan counter 22 to interrogate designated stages. Normally the bits forming a data word are extracted sequentially, starting at one end of the word and proceeding to the last bit at the other end of the word. To accomplish this, the scan counter 22 receives an initial binary count that designates the particular stage in the input shift register 10 containing the bit found at one end of the word, and is set to count either up or down, depending on which end it begins, to scan in sequence the remaining bits in the word. After the initial count is set, a control gate 23 is enabled to pass high frequency clock pulses to be counted by the scan counter 22. The high frequency clock pulses are normally generated to synchronize data handling operations in the associated computer or other data processing equipment that may be coupled to the output of the data word processor. Usually the frequency of this clock pulse signal is much higher than the bit repetition rate of the digital telemetry data being received. In any event, the high frequency clock pulses should have a frequency at least several times the data input rate, so that data words in the input shift register 10 can be scanned in either direction before being shifted too many times. The control gate 23 functions to deliver these clock pulses selectively, in response to gating signals, to operate various units in the system.

The scanning operation used to sequentially extract the bits of a data word from the input shift register 10 may best be described by way of example. Assume that a word containing N binary bits is entered serially, one bit at a time, into the first stage of the input shift register 10. As each new bit arrives, the previous bit is shifted to the next adjacent stage in response to a shift pulse obtained from the output of a gate circuit 24. It is common practice to generate a synchronizing signal, herein termed an "input timing signal," synchronized with the bit intervals in the input signal. Each of these input timing signals acts to enable the normally closed gate circuit 24 to pass the first high frequency clock pulse occurring during each input bit interval to the input shift register 10. In this way, the input shift register operation can be properly synchronized with the various other units operated by the high frequency clock pulses.

When the bits of the data word are properly aligned in the input shift register 10, the scanning operation may then begin. It is not necessary for all N bits in the word to be in the shift register 10 before scanning begins when the direction of scan is toward the input since additional bits can be received during scanning. Assume that the input shift register 10 is sixty-four stages long with the first stage in the series being numbered sixty-four and the numbers for the other stages decreasing in the direction of the data shift. Assume that a data word has been entered with the least significant bit first, and the bits are to be delivered to an output in that same order. To accomplish this, the scan counter 22 receives an initial count in the form of a parallel binary number P designating the stage then containing the least significant bit. This initial count is decoded by the scanning unit 20, which then extracts the least significant bit from stage P. The scan counter 22 also receives an appropriate UP direction control signal that sets it to count upwards, and at the same time a gating signal enables the gate control circuit 23 to pass clock pulses to be counted to the scan counter 22. When the next high frequency clock pulse occurs, the scan count increases to $P+1$, thus causing the next least significant bit to be extracted. Subsequent high frequency clock pulses passed by the control gate 23 continue incremeting the count in the scan counter 22 until all N bits in the word have been extracted.

Now, if the bits forming a word are shifted during the scanning operation, the count in the scan count of 22 must be adjusted to compensate for this fact. In this case, the upwards count is adjusted by delivering the shift pulse used to operate the input shift register 10 to the input of an AND gate 26. The UP control signal, that sets the direction of the count in the scan counter 22, is also applied to enable AND gate 26, so that it passes any shift pulse occurring during the scanning operation to disable a normally open gate 28, which may be referred to as an "inhibit gate." Normally, the inhibit gate 28 passes the high frequency clock pulses passed by the control gate 23 to the input of the scan count of 22 through an OR gate 30. But, when the shift pulse passed through the AND gate 26 disables the inhibit gate 28, one of the high frequency clock pulses is prevented from reaching the scan counter 22, and the scan count remains at its previous value. Since each bit in the shift register 10 has been shifted to the next stage, the next bit in the scan sequency is extracted from the same stage that previously held the last bit extracted.

The scanning operations move in the opposite direction to reverse the original bit sequence. For example, a scanning operation intended to extract the least significant bit first from a word that has been received with the most significant bit first demands that the scanning operation begin at the other or trailing end of the word. Accordingly, the initial count entered into the scan count of 22 equals the sum of the number P, which represents the position of the most significant bit, and the number N, which equals the total number of bits in the word. The binary digits for the initial $P+N$ count are entered into the scan counter 22 in parallel, and a DOWN control signal applied to the scan counter 22 causes it to count downwards from $P+N$ to N in response to the high frequency clock pulses received through the normally open inhibit gate 28 and the OR gate 30. The scanning unit 20 follows the downward count to extract the bits in sequence from the appropriate stages of the input shift register 10. If the word bits being extracted are shifted during this scanning operation, the scan count in adjusted by decrementing two counts so that the scanning unit 20 can move to the next bit in the word sequence. To accomplish this, the shift pulse is applied through a normally closed AND gate 34, which is enabled by the DOWN control signal, and then through a phase shifter 36 to the input of the scan counter 22. The phase shifter 36 delays the shift pulse sufficiently to permit the counting circuits in the scan counter 22 to respond both to the normal high frequency clock pulse and to this delayed pulse, both of which occur during a single clock pulse interval. Thus the scan count is decreased by two, instead of the normal one, during the clock interval following the shift operation.

Timing of the various computer operations to occur in correct sequence using appropriately phased clock pulses presents no problem to those skilled in the art. However, it is worth noting here that the operation performed by the scanning unit 20 in extracting a binary bit from a stage of the input shift register 10 should be phased to occur after the phase delay interval provided by the phase shifter 36, so that the count in the scan counter 22 has sufficient time to change twice before the next bit is extracted.

As described hereinabove, the scanning operation takes place in one direction by scanning from stage P to the stage $P+N$, and in the other direction from $P+N$ to P, with the count being adjusted for any shift of the bits in the input register before completion of the scanning operation. To insure that the scanning operation in both instances stops at the proper point, after all bits in the word have been extracted, a bit counter 38 may be employed. Before the beginning of each scanning operation, the binary number N is entered in parallel into the bit counter 38 from an arithmetic and control unit 40, the operation of which will be described in somewhat more detail hereinafter. Thereafter, high frequency clock pulses passed by the control gate 23 are applied to the input to cause the bit counter 38 to count downwards. When the zero count is reached, a zero detector circuit 42 delivers an OFF signal back to an arithmetic and control unit 40 to stop the scanning operation. The control gate 23 then receives a gating signal from the arithmetic and control unit that blocks passage of further clock pulses to the bit counter 38 and the scan counter 22. Also both counters 22 and 38 may be set to an inactive state by control signals from the arithmetic and control unit 40. Thus the scanning ceases after N bits of the word being scanned are extracted since one of the bits is being extracted each time a high frequency clock pulse occurs, whether the count in the scan count of 22 changes by one or two or not at all.

Referring now to FIG. 2, the scan counter 22 and the scanning unit 20 are shown in somewhat more detail to illustrate one preferred form of a high-speed commutation circuit arrangement that can be used for the scanning operation. In this figure, assuming that the input shift register 10 has sixty-four stages, the scan counter 22 contains six or more identical binary stages connected in reversible counter fashion. The application of an UP or DOWN control signal selects one of two interstage coupling arrangements that cause the count therein to be either incremented or decremented by the clock pulses received from the OR gate 30. Each counter stage may consist of a conventional high speed flip-flop circuit capable of assuming one of two stable states. Depending on the binary value stored, an appropriate output voltage appears on either one of its two output terminals, which are coupled as separate binary inputs to a conventional diode decoding matrix 51. The diode decoding matrix 51 has a separate output corresponding to each of the sixty-four stages in the input shift register 10. A signal is applied to the particular matrix corresponding to stage number designated by the binary count contained in the scan counter 22.

The output from each stage of the input shift register 10 is applied to the input of a respective normally closed AND gate 50. Each AND gate 50 is coupled to receive its enabling signal from the corresponding output of the diode decoding matrix 51 so that when the count in the scan counter 22 corresponds to the number of a given stage in the input shift register 10, then the binary value contained in that stage is transferred via its output connection 14 through the enabled AND gate 50 to a common output line that couples the outputs from all of the AND gates together. As the count in the scan counter 22 changes, the enabling signal is switched to the designated AND gate 50 to extract the next bit. Of course, this scanning operation can be performed by any high speed commutator circuit capable of selectively interrogating the different stages of the input shift register 10.

The above described scanning operation assumes that the bits are to be extracted by simply scanning from one end of a word to the other. However, it is also possible using the above-described circuitry to obtain the word bits in any desired order, either one at a time or in selected subgroupings, by stopping and restarting the scanning operation at another point, or even reversing the direction of scan at some new point in the word. This would only require the entry of appropriate counts into the scan counter 22 and the bit counter 38, and the generation of proper UP or DOWN control signals from the arithmetic and control unit 40. Moreover, two or more words contained in the input data register might be extracted in the reverse order of their receipt, or the same word might be extracted more than once with differently ordered bits. In other words, the scanning operation provides an efficient method for rearranging the bit and word sequences to appear in any selected serial order at a common output terminal 54.

The data bits forming a word, which have been placed in a desired serial order by the scanning operation, are delivered at a rate determined by the high frequency clock pulses to a distributor unit 56 to be properly aligned in accordance with the use to be made of the information. For example, most telemetry words are received most significant bit first, whereas most computer operations require that the least significant bits of the words be aligned. The desired alignment is achieved by the distributor unit 56 which routes the data bits received from the scanning unit 20 to the particular stage in an output shift register 58 designated by the value of a binary number R contained in a distributor register 59. The high frequency clock pulses gated through the control gate 23 operate the shift register to cause the data bits to be shifted from one stage to the next toward a serial data output terminal 60 at the same rate at which these bits are being received from the scanning unit 20. Thus all the bits of a word can be entered into a single stage of the output shift register 58, since each new bit arrives after the previous bit has been shifted to the adjacent stage.

Each output shift register stage has a separate output terminal so that the bits forming an entire data word can be output as a parallel word. Thus, when a complete word has been entered in the output shift register 58, the bits are aligned to be output in parallel from selected stages in accordance with the number R contained in the distributor register 59 or, the complete word may be shifted further until a particular output alignment is achieved. Shifting of the data bits entered in the output shift register 58 is controlled by gating signals applied to the gate control circuit 23. Normally the clock pulses applied to the output shift register 58 are blocked upon occurrence of the OFF signal at the end of each scanning operation to await parallel output. However, the arithmetic and control unit 40 may be programmed to permit further shifting of the entire word for serial output or until another parallel output alignment is achieved.

The gating control circuit 23 is not shown in detail herein, but should be understood to include a gating arrangement for receiving the high frequency clock pulses from a source to be selectively applied as shift pulses to the output shift register 58 and as pulses to be counted by the bit counter 38 and the scan counter 22 to control the scanning operation. In most cases, the true gating functions are performed simultaneously so that a single gate could be used. However, for versatility three separate gates, each responsive to a different gating signal from the arithmetic and control units are preferred, particularly where the word in the output shift register 58 needs to be shifted after completion of the scanning operation. Normally, however, the gates in the gating control circuit 23 are opened simultaneously at the beginning of each scanning operation, and closed at the end when the OFF signal is generated.

Arithmetic and control unit 40 will be shown and described only generally herein since the details of its operation are not essential to a complete understanding of the invention. Moreover, the arithmetic and control functions performed by this unit can be accomplished in any of a number of different ways, using appropriate digital circuitry well known to those skilled in the art. Any general purpose digital computer would be suitable or, as is the case in the actual data processing units constructed in accordance with this invention, special purpose computation circuitry can be used that requires only very limited amounts of additional digital circuitry, including an adder arrangement for performing the $P+N$ computation, one or more comparator circuits, and a small memory unit, along with appropriate interconnection circuitry. The operation of the arithmetic and control unit 40 is probably best understood by considering a typical operating sequence.

Normally telemetry data is received as a continuous sequence of binary bits grouped to form separate data words of varying length, each having a different type of information content. Such telemetry sequences are usually repetitive; that is, each sequence contains the same number of words, each having a set number of bits, and a predetermined order in the sequence. Thus, the entire telemetry sequence repeats itself, except for changes in the binary value of the individual every so many bits. Normally the beginning of each telemetry sequence is marked by an initial bit sequence that can be easily identified. The binary values in the initial bit sequence are chosen so that there is a high probability that the same bit sequence would not occur elsewhere within any telemetry sequence as a part of the information content.

An incoming telemetry sequence is entered, either in series or in parallel, into the input shift register 10 to be shifted at a rate corresponding to the bit rate at which it is being received. The binary bits stored in the input shift register 10 can then be examined to detect the initial bit sequence used to identify the beginning of a complete telemetry sequence. In one practical embodiment of this invention, this is accomplished by entering a binary bit sequence, into the output shift register 58 from a memory in the arithmetic and control unit 40 either initially or at the end of each telemetry sequence. These bits are then compared through a mask register (not shown), which screens out all the other bit positions, both in the input shift register 10 and the output shift register 58, in excess of the number of bits in the initial bit sequence. An appropriate multidigit binary comparator circuit (not shown) compares the sequence in the output register 58 with the binary outputs from a corresponding number of stages, usually the initial stages, of the input shift register 10.

When the comparator circuit detects the initial bit sequence in the first stages of the input shift register 10, the arithmetic and control unit 40 begins a programmed operation, controlled by an input counter 62, that lasts for the entire telemetry sequence. Assume that, immediately after the initial bit sequence is detected, the first bit of the first word in the telemetry sequence is received in the first stage (stage number sixty-four) of the input shift register 10. The input counter 62 is then actuated to begin counting downwards from sixty-four, decrementing by one each time a shift pulse is applied to the input shift register 10. Thus, the input counter 62 tracks the first bit of the telemetry sequence. When the input counter 62 reaches a certain count P, the scanning operation begins to extract the first word. Normally the number P is equal to the number of bits contained in the first word subtracted from sixty-four, although it is not necessary for all bits to be entered if the word is to be scanned in the order received. This can be done merely by comparing the count contained in the input counter 62 with the number P found in the first memory position. When the input count coincides with the number P stored in the memory, the arithmetic and control unit 40 immediately delivers an enabling signal to the gating control circuit 23 to begin the scanning operation. Also, the P count from the input counter 62 or from the memory is entered into the scan counter 22 and an UP control signal is applied, or the $P+N$ addition computation is first performed, the N value being also derived from the first memory position, and the result is entered into the scan counter 22 and a DOWN control signal. The choice depends upon whether the first word is to be extracted in the same or a reverse bit sequence. At the same time, the binary number N, representing the number of bits in the first word, is entered from the first memory position into the bit counter 38, and the binary number R is entered from the first memory position into the distributor register 59 to properly align the word for output. When the count in the bit counter 38 reaches zero, the zero detector 42 delivers an OFF signal back to the arithmetic and control unit 40 signaling the end of the scanning operation for the first word, and preparing the system to scan the second word in the telemetry sequence by cycling to the second memory position. The unit 40 in turn may generate a transfer pulse to signal the associated equipment that the complete word is available in the output shift register 58 for parallel output.

For subsequent words the operation of the arithmetic and control unit 40 is essentially the same, except that with most telemetry sequences it is not necessary to reexamine the content of the input shift register 10 to determine the location of subsequent words since they appear in known sequence a certain number of bits from the beginning of the sequence. Thus, it is possible to merely continue the count in the input counter 62 to determine the total number of bits received since the beginning of any telemetry sequence. This count can then be compared with the number P maintained at each memory position to signal the desired starting point for the second and subsequent scanning operations. Alternatively, input counter 62 may be cleared at the completion of each scanning operation to begin counting again from an initial count that is entered to indicate the particular stage in the input shift register 10 containing the first bit of the next word to be scanned. If this is done, then the initial count P entered into the scan counter 22 can be obtained directly from the input counter 62, instead of from the memory in the arithmetic and control unit 40. However, in either case, the amount of circuitry needed is essentially the same.

The above described operations are repeated for each subsequent word in the telemetry sequence, until the last word has been scanned. At the end of each word, the OFF signal from the zero detector 42 causes the arithmetic and control unit 40 to cycle to the next memory position that contains the digital values P, N and R, and the UP or DOWN control signal, needed for scanning and aligning the next word. After the final word in the telemetry sequence, the arithmetic and control unit 40 recycles to an initial state to enter the initial bit sequence in the output shift register 58, as previously described, so that the entire operation can be resynchronized for the next telemetry sequence. Since the telemetry sequence is repetitive, resynchronization after each telemetry sequence would not be necessary except for the possibility that noise mixed with the incoming data might produce an erroneous bit count. On certain practical embodiments, a windowing effect is employed to check the synchronization at the end of each sequence and modify the system operation to correct for small synchronization errors.

To simplify the drawing and the description, certain interconnections between the units, used to achieve synchronization and to accomplish certain other control functions as described above, have been illustrated herein in FIG. 1 by a single control data input 63 to the arithmetic and control unit 40.

It should be noted that the bit sequence of a word can also be reversed or otherwise changed by using a shift register capable of shifting binary bits in either direction. In this way, the word in the input shift register 10 is scanned only in one direction, since the bits extracted can be introduced into the output shift register 58 to be shifted towards either one end or the other by applying an appropriate shift direction control signal from the arithmetic and control unit 40. A different serial output terminal would have to be provided for both the first and the last stages of the output shift register to handle data being shifted in either direction. However, both the circuitry and the programming become more complicated with such an arrangement.

Accordingly, from the detailed description contained herein, it is seen that a digital data processor, in accordance with this invention, is capable of reformatting digital data bit sequences in a completely universal fashion for either parallel or serial output. Bit sequences and individual words of various lengths can be maintained, reversed, or otherwise selectively reordered to suit a particular output requirement. The same word can be output with one or more bit sequences, and can be aligned in any manner at the output. Moreover, the data word processing arrangement acts as a efficient time buffer wherein digital data received having lower bit repetition rates compatible with telemetry and other transmission link requirements can be output in selected word groupings at any selected higher bit rates corresponding to the higher data handling rates of modern data processing and computer equipment.

Whereas certain preferred embodiments of data processing arrangement in accordance with this invention have been particularly described and illustrated herein in order to explain the nature of this invention, it should be understood that various changes, modifications and alternations other than those mentioned herein may be made by those skilled in the art without departing from the spirit and scope of the invention as expressed in the appended claims.

What is claimed is:

1. A digital data word processor for receiving digital information comprising: an input register means having a plurality of stages for temporarily storing a continuous sequence of data bits received at a given input rate; an output register means having a plurality of stages for temporarily storing data bits extracted from said input register means at an output rate in excess of said input rate; first commutator means responsive to a first control signal for sequentially extracting the data bits forming a data word from selected stages of the input register at said output rate; second commutator means responsive to a second control signal from delivering the binary bits extracted from the input register means to selected stages of the output register means in accordance with a desired alignment of the bits; and control means responsive to the position of the word in the input register, the number of bits in the word, and the desired bit sequence and alignment of the word in the output register to generate the first and second control signals to operate the first and second commutator means.

2. A digital data word processor for receiving continuous sequences of digital data bits grouped as individual words comprising: a multi-stage input shift register for storing in the order received individual data bits forming one or more data words, said data bits being serially shifted from stage to stage at a rate equal to the bit repetition rate of the digital data being received; a multi-stage output shift register for shifting binary bits received sequentially in a selected one of the stages at an output rate in excess of the digital data input rate; first commutator means responsive to a first digital control signal for sequentially extracting the data bits forming a word at the output rate from selected stages of the input register; second commutator means responsive to a second digital control signal for entering the data bits extracted from the input shift register into the selected one of the stages of the output shift register, said selected one of the stages of the output shift register being chosen in accordance with a desired alignment of the word after all bits have been inserted, said data bits forming the word being shifted together from one stage to the next in a predetermined direction at the output rate; counter means responsive to the shifting of the digital data bits in the input shift register for tracking the position of the data bits forming a word in the input shift register means; and control means responsive to the count contained in the counter means for generating said first and second digital control signals for operating the first and second commutating means in accordance with a desired bit sequence and alignment of the word in the output shift register.

3. A digital data word processing comprising: a multi-stage input register for temporarily storing digital data bit sequences forming data words in successive stages in the order received; a first commutator means responsive to first digital control signals for extracting the digital data bits from successive stages of the input register means at an output rate in excess of the data input rate to the input shift register; reversible counter means for receiving an initial count indicative of that stage in the input register means containing the digital data bit found at one end of the word and for counting in either direction in response to clock pulses occurring at the output rate to provide the first digital control signal to the first commutator means; second commutator means responsive to a second digital control signal for introducing each bit extracted from the input register means into a selected stage of an output register means in accordance with a desired bit alignment in the output register means; and control means responsive to the digital data bits received for operating in accordance with a stored program to provide the initial count for entry into the reversible counter, a direction signal for setting the direction of the count in the reversible counter, and a second digital control signal for operating said second commutator means.

4. A digital data word processor for reformatting digital data information comprising: an input shift register having a plurality of interconnected stages for storing data bit sequences received at a given input rate, the data bits stored in said input shift register being shifted from one stage to the next at a rate corresponding to the data input rate; means for tracking the position in the input shift register of data bit sequences forming separate data word groupings; commutator means responsive to a digital control signal for extracting the data bit contained in any selected stages of the input shift register designated by a digital control signal; and means responsive to the tracking means for generating the digital control signal, said digital control signal being varied to sequentially extract the data bits forming the separate data word grouping in a predetermined order, at a rate exceeding the input rate, from the indicated stages of the input shift register.

5. The data word processor of claim 4 further including output means coupled to receive the sequentially extracted data bits to form an output data word having a predetermined bit sequence corresponding to the sequence in which the individual data bits were extracted from the input shift register.

6. In a digital data word processor for reformatting digital data received as a continuous sequence of data bits grouped as separate data words, an arrangement comprising: an input register means having a series of separate stages for storing digital data bits in the order received; means for generating an initial digital count indicative of the particular stage containing the digital data bit found at one end of a data word; digital counter means for receiving said initial digital count and for counting in a selected direction indicative of those stages containing the other digital data bits forming the data word; means including a high frequency source of pulses to be counted for changing the count in the counter means to indicate successive stages in the input register means containing the data word; and commutator means for extracting the digital data bits from the stages of the input register indicated by the instantaneous count in the counter means.

7. A digital data processor comprising: an input register means for storing digital data bits forming separate word sequences in the order received, commutator means coupled to the input register means for extracting the stored digital data bits in a selected order in response to a digital data control signal; means for generating the digital data control signal to sequentially extract the digital data bits at a rate in excess of the input rate; and an output register; and means for introducing the digital data bits extracted from the input register means into selected positions in the output register in accordance with a desired alignment of the digital data bits forming the word and in the order in which the digital data bits were extracted from the input register means.

8. A digital data processor for selectively reformatting digital data bit sequences grouped to separate data words comprising: an input shift register having a plurality of separate stages for storing individual digital data bits forming a data word, said input shift register being capable of receiving the digital data bits either in parallel or in series and shifting them from stage to stage at a rate corresponding to the bit repetition rate of the digital data being received; a scanning unit responsive to a digital control count for extracting the digital data bits forming a data word from selected stages of the input register; a reversible counter for generating the digital control count to control the scanning unit; control means for providing a first initial count to the reversible counter indicative of the stage in the input shift register containing the digital data bit found at one end of a selected data word and for causing the reversible counter to count in a selected direction to extract the data bits forming the rest of the data word from succeeding stages of the input shift register; means for counting each shift of the digital data bits in the input shift register for tracking the position of the word in the input shift register, the operation of said control means being responsive to the count contained therein; a bit counter for receiving a second initial count equal to the number of bits in the data word being extracted and counting downward toward zero; an output shift register having a plurality of stages for receiving the digital data bits forming the data word being extracted from the input shift register; a distributor unit responsive to digital control signal for routing the digital data bits extracted from the input shift register to a particular stage of the output shift register; means for generating high frequency clock pulses to be counted by the reversible counter and the bit counter, and for operating the output shift register to shift the bits extracted from stage to stage; and means responsive to the shift pulses applied to the input shift register and to the high frequency clock pulses generated for adjusting the counting in the reversible counter means whenever the digital data bits contained in the input shaft register means are shifted during a scanning operation, whereby the bit sequence of a word received at the input shift register may be selectively reordered by the scanning unit to be entered with a desired alignment in the stages of the output shift register for output at a rate exceeding the bit repetition of the input rate.

9. A data word processor comprising: means for individually storing data bit sequences grouped as separate data words; means for emitting a variable control signal which continually identifies the location of bits forming a data word in the storage means; commutator means responsive to the identifying control signal of said emitting means for sequentially extracting the data bits forming the data word in a selected order from individual portions of the storage means as identified by variations in the control signal; and output means containing a plurality of output terminals for temporarily storing the data bits in the sequence extracted for output on selected output terminals.

10. A data word processor comprising: means for storing data bit sequences forming data words; means responsive to the value of a control signal for extracting the data bits from selected storage positions in the storage means; and means for generating a variable control signal including means for varying the control signal through a predetermined sequence of discrete values to extract the data bits forming a data word in a selected sequence from the storage means at a predetermined output rate.

11. A data word processing arrangement for selectively revising the bit sequence of individual data words comprising: an input shift register for receiving a data bit sequence from an external source at a given input rate, said input shift register having a plurality of stages interconnected in shift register fashion to shift the data bits received from one stage to the next in accordance with the input rate; commutator means responsive to a digital control signal for extracting the data bits stored in the input shift register from selected stages in accordance with the value of the digital control signal; a high speed reversible counter means for generating said digital control signal in accordance with the count contained therein; means responsive to the shifting of the data bits in the input shift register for determining the position of a data word to be extracted; means responsive to said determining means for introducing an initial count into the high speed counter means when the data word reaches a predetermined position, said initial count being indicative of the stage containing a bit at one end of the bit sequence forming the data word to be extracted. and for controlling the direction of the count in the high speed counter means to extract the data bits in a sequence according to the direction of the count; a source of high frequency pulses to be counted by the high speed counting means whereby the bits forming a data word are extracted at a rate in excess of the input rate and in a selected sequence from the stages of the input shift register.

References Cited

UNITED STATES PATENTS

| | | | |
|---|---|---|---|
| 3,308,437 | 3/1967 | Barbagallo et al. | 340—172.5 |
| 3,229,259 | 1/1966 | Barker et al. | 340—172.5 |
| 3,164,807 | 1/1965 | Reque | 340—172.5 |

ROBERT C. BAILEY, *Primary Examiner.*

G. D. SHAW, *Assistant Examiner.*